US012687873B2

(12) United States Patent
Uchimoto

(10) Patent No.: US 12,687,873 B2
(45) Date of Patent: Jul. 21, 2026

(54) LINEAR POWER SUPPLY CIRCUIT AND VEHICLE

(71) Applicant: ROHM CO., LTD., Kyoto (JP)

(72) Inventor: Daisuke Uchimoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 204 days.

(21) Appl. No.: 18/763,318

(22) Filed: Jul. 3, 2024

(65) Prior Publication Data

US 2024/0353881 A1      Oct. 24, 2024

Related U.S. Application Data

(63) Continuation of application No. PCT/JP2022/040105, filed on Oct. 27, 2022.

(30) Foreign Application Priority Data

Jan. 6, 2022      (JP) ................................. 2022-000851

(51) Int. Cl.
  *G05F 1/575*      (2006.01)
  *B60R 16/03*      (2006.01)
        (Continued)

(52) U.S. Cl.
  CPC .............. *G05F 1/575* (2013.01); *B60R 16/03* (2013.01); *G05F 1/59* (2013.01); *G05F 3/262* (2013.01)

(58) Field of Classification Search
  CPC .......... G05F 1/462; G05F 1/465; G05F 1/468; G05F 1/56; G05F 1/575; G05F 1/562;
        (Continued)

(56) References Cited

U.S. PATENT DOCUMENTS

2012/0038332 A1*   2/2012   Lin ......................... G05F 1/575
                                                        323/277
2017/0192444 A1*   7/2017   Usuda ..................... G05F 1/569
        (Continued)

FOREIGN PATENT DOCUMENTS

JP      2020-071681      5/2020

OTHER PUBLICATIONS

International Search Report and Written Opinion in International Appln. No. PCT/JP2022/040105, mailed on Dec. 20, 2022, 13 pages (with machine translation).

*Primary Examiner* — Jeffrey A Gblende
(74) *Attorney, Agent, or Firm* — Fish & Richardson P.C.

(57)      ABSTRACT

A linear power supply circuit includes: an output stage including a first and a second output transistor connected in parallel between an input terminal to which an input voltage is applied and an output terminal to which an output voltage is applied; a driver configured to drive the first and second output transistors according to the difference between a voltage based on the output voltage and a reference voltage; and a potential difference suppressor configured to suppress the potential difference between the control terminals of the first and second output transistors. The potential difference suppressor includes an operational amplifier. The non-inverting input terminal of the operational amplifier is connected to the control terminal of the first output transistor. The inverting input terminal and the output terminal of the operational amplifier are connected to the control terminal of the second output transistor. The operational amplifier includes a phase compensation element.

12 Claims, 9 Drawing Sheets

(51) Int. Cl.
  *G05F 1/59*      (2006.01)
  *G05F 3/26*      (2006.01)
(58) Field of Classification Search
  CPC .......... G05F 1/563; G05F 1/565; G05F 1/567;
        G05F 1/569; G05F 1/571; G05F 1/573;
          G05F 1/5735; G05F 1/59; G05F 3/262
  See application file for complete search history.

(56) References Cited

U.S. PATENT DOCUMENTS

| | | | |
|---|---|---|---|
| 2018/0136679 A1* | 5/2018 | Ide | G05F 5/00 |
| 2020/0244160 A1* | 7/2020 | Mitev | G05F 1/565 |

* cited by examiner

INVERTING INPUT TERMINAL
& OUTPUT TERMINAL

NON-INVERTING INPUT TERMINAL

LINEAR POWER SUPPLY CIRCUIT AND VEHICLE

CROSS-REFERENCE TO RELATED APPLICATIONS

This nonprovisional application is a continuation application of International Patent Application No. PCT/JP2022/040105 filed on Oct. 27, 2022, which claims priority Japanese Patent Application No. 2022-000851 filed in Japan on Jan. 6, 2022, the entire contents of which are hereby incorporated by reference.

BACKGROUND OF THE INVENTION

1. Technical Field

The invention disclosed herein relates to linear power supply circuits, and also relates to vehicles that incorporate linear power supply circuits.

2. Description of Related Art

Linear power supply circuits such as those of the LDO (low-dropout) type are employed as a power supply means in a variety of devices.

Linear power supply circuits are desired to permit phase compensation without a large increase in circuit area even with a reduced capacitance value in an output capacitor.

One example of known technology related to what has just been mentioned is seen in JP-A-2020-71681.

FIG. 10 is a diagram showing a known linear power supply circuit disclosed in JP-A-2020-71681.

The known linear power supply circuit includes an input terminal T1, an output terminal T2, a first output transistor 1, a driver 2, a reference voltage generator 3, and a phase compensation circuit 8. This linear power supply circuit further has an output capacitor 6 and a load 7 externally connected to it, and bucks (steps down) an input voltage VIN to generate an output voltage VOUT, supplying it to the load 7. The conductances (reversely put, on-resistance values) of the first output transistor 1 and a second output transistor 81, of which the latter will be described later, are controlled with a gate signal G1. In the configuration shown in FIG. 10, the first and second output transistors 1 and 81 are implemented as PMOSFETs (P-channel MOSFETs). Accordingly, as the voltage level of the gate signal G1 decreases, the conductances of the first and second output transistors 1 and 81 increase and the output voltage VOUT rises.

The driver 2 includes a differential amplifier 21, a capacitance 22, a PMOSFET 23, a current amplifier 24, and a PMOSFET 25 as part of a current mirror.

One terminal of the capacitance 22 is fed with the output of the differential amplifier 21, and the other terminal of the capacitance 22 is fed with a ground potential. Thus the connection node between the differential amplifier 21 and the capacitance 22 is grounded to the ground in a high-frequency band, and this achieves fast response in the driver 2.

The phase compensation circuit 8 includes a second output transistor 81, a resistor 82, and a capacitor 83.

One terminal of the resistor 82 is connected to the gates of the first output transistor 1 and the PMOSFET 25, the latter being part of a current mirror. The other terminal of the resistor is connected to the gate of the second output transistor 81. The capacitor 83 is provided between the gate and the source of the second output transistor 81.

Now, a description will be given of the function of the phase compensation circuit 8 in the linear power supply circuit shown in FIG. 10 according to known technology. FIG. 11 is a diagram showing the gain characteristics of the transfer function of the first output transistor 1 and the phase compensation circuit 8. A first pole frequency FP1' is the frequency of a first pole ascribable to a parasitic capacitance CPD. The first pole of the transfer function of the first output transistor 1 is a pole with which the output capacitor 6 is unrelated.

When a current passes through the second output transistor 81, which has a CR circuit (the resistor 82 and the capacitor 83) connected to its gate, the first pole frequency FP1' shifts to a lower range as compared with if the phase compensation circuit 8 is not provided (thick broken line). This results in a reduced gain in a range higher than the first pole frequency FP1' as compared with if the first pole frequency FP1' does not shift to a lower range.

Moreover, owing to the first and second output transistors 1 and 81 being connected in parallel, the first output transistor 1 is not influenced by the resistor 82. Thus another pole appears at the original position of the first pole frequency FP1' before its shift to a lower range, and the frequency of this pole is a second pole frequency PF2'. As the first pole frequency FP1' shifts to a lower range and the gain drops, the zero-cross frequency FZC' shifts to a lower range.

The first and second pole frequencies FP1' an FP2' are related to the second pole frequency of the transfer function of the linear power supply circuit and the output capacitor 6 shown in FIG. 10. Thus the phase compensation circuit 8 can shift the second pole frequency of the transfer function of the linear power supply circuit and the output capacitor 6 shown in FIG. 10 to a lower range as compared with if the phase compensation circuit 8 is not provided. And owing to this shift, the phase compensation circuit 8 can, in a range higher than the second pole frequency of the transfer function of the linear power supply circuit and the output capacitor 6 shown in FIG. 10, lower the gain of the transfer function of the linear power supply circuit and the output capacitor 6 shown in FIG. 10 as compared with if the phase compensation circuit 8 is not provided. As a result, the zero-cross frequency of the transfer function of the linear power supply circuit and the output capacitor 6 shown in FIG. 10 shifts to a lower range. That is, the linear power supply circuit shown in FIG. 10, if only the phase compensation circuit 8 is added to it (thus without a large increase in circuit area) permits phase compensation even with a reduced capacitance in the output capacitor 6.

DESCRIPTION OF EMBODIMENTS

In the present description, a constant voltage denotes a voltage that is constant under ideal conditions and may be a voltage that can in reality vary slightly with change in temperature and the like.

In the present description, a reference voltage denotes a voltage that is constant under ideal conditions and may be a voltage that can in reality vary slightly with change in temperature and the like.

In the present description, a constant current denotes a current that is constant under ideal conditions and may be a current that can in reality vary slightly with change in temperature and the like.

In the present description, a MOSFET denotes a field-effect transistor of which the gate has a structure composed of at least three layers which are: a layer of a conductor or a semiconductor with a low resistance value such as poly-silicon; a layer of an insulator; and a layer of a P-type, N-type, or intrinsic semiconductor. That is, a MOSFET may have any gate structure other than a three-layer structure of metal, oxide, and semiconductor.

First Embodiment

Figure 1:
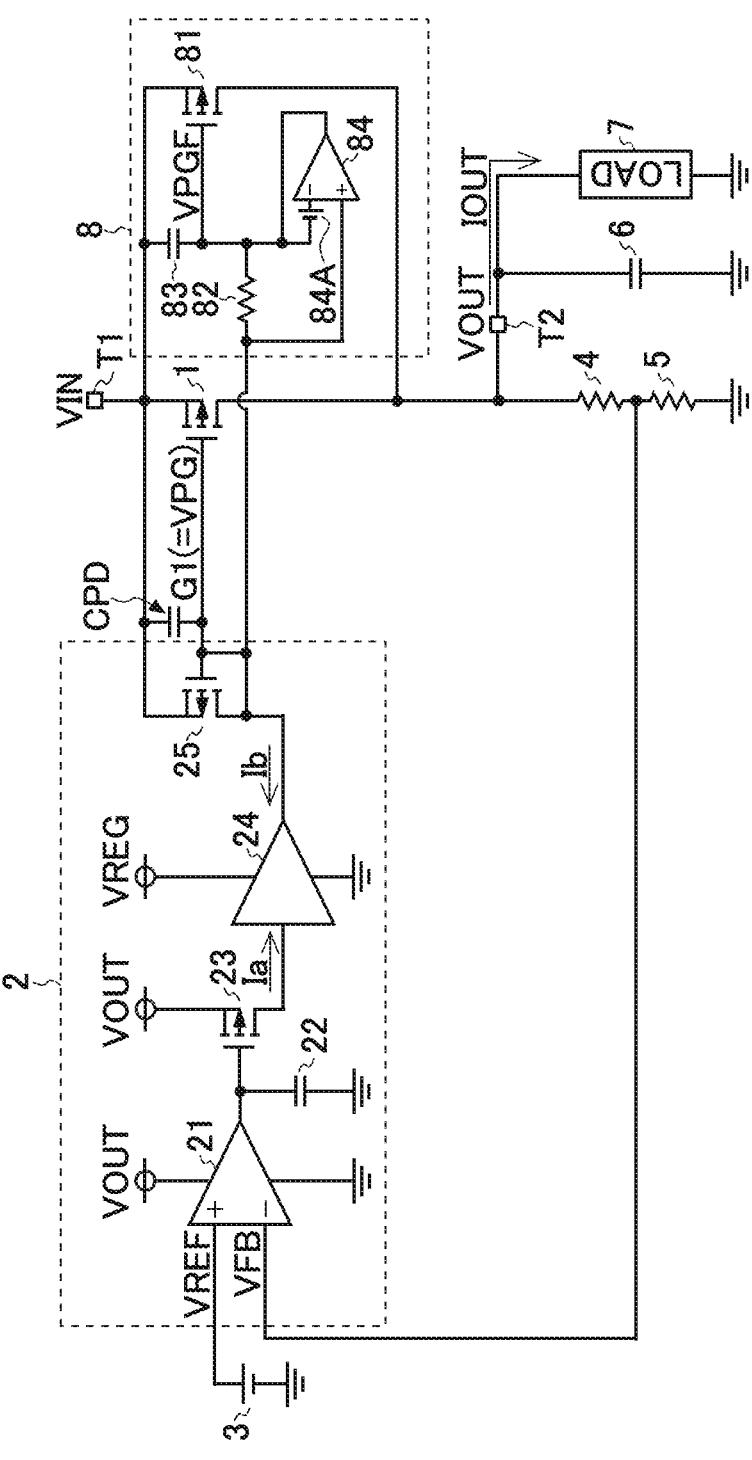
FIG. 1 is a diagram showing one configuration example of a linear power supply circuit according to a first embodiment.

FIG. 1 is a diagram showing one configuration example of a linear power supply circuit according to a first embodiment. The linear power supply circuit shown in FIG. 1 includes an input terminal T1, an output terminal T2, a first output transistor 1, a driver 2, a reference voltage generator 3, resistors 4 and 5, and a phase compensation circuit 8. The linear power supply circuit further has an output capacitor 6 and a load 7 externally connected to it.

The first output transistor 1 is provided between the input terminal T1, to which an input voltage VIN is applied, and the output terminal T2, to which an output voltage VOUT is applied.

The driver 2 drives the first output transistor 1 and a second output transistor, of which the latter will be described later. Specifically, the driver 2 feeds a gate signal G1 to the gate of the first output transistor 1 and, via the resistor 82, to the gate of the second output transistor 81, and thereby drives the first and second output transistors 1 and 81. The conductances (reversely put, on-resistance values) of the first and second output transistors 1 and 81 are controlled with the gate signal G1. In the configuration shown in FIG. 1, the first and second output transistors 1 and 81 are implemented as PMOSFETs. Accordingly, as the voltage level of the gate signal G1 decreases, the conductances of the first and second output transistors 1 and 81 increase and the output voltage VOUT rises. By contrast, as the gate signal G1 increases, the conductances of the first and second output transistors 1 and 81 decrease and the output voltage VOUT falls. The first output transistor 1 and the second output transistor can be implemented as, instead of PMOS-FETs, NMOSFETs or bipolar transistors.

The driver 2 includes a differential amplifier 21, a capacitance 22, a PMOSFET 23, a current amplifier 24, and a PMOSFET 25.

The inverting input terminal (−) of the differential amplifier 21 is fed with a feedback voltage VFB, and the non-inverting input terminal (+) of the differential amplifier 21 is fed with a reference voltage VREF. Based on the difference value $\Delta V$ (=VERF−VFB) between the feedback voltage VFB and the reference voltage VREF, the driver 2 drives the first and second output transistors 1 and 81. As the difference value $\Delta V$ decreases, the driver 2 raises the voltage level of the gate signal G1; as the difference value $\Delta V$ increases, the driver 2 lowers the voltage level of the gate signal G1.

One terminal of the capacitance 22 is fed with the output of the differential amplifier 21, and the other terminal of the capacitance 22 is fed with a ground potential.

The source of the PMOSFET 23 is fed with the output voltage VOUT, and the gate of the PMOSFET 23 is fed with a voltage (the voltage at the connection node between the differential amplifier 21 and the capacitance 22) based on the output of the differential amplifier 21. The PMOSFET 23 converts the voltage based on the output of the differential amplifier 21 into a current and outputs this current from its drain. The connection node between the differential amplifier 21 and the capacitance 22 is grounded to the ground in a high-frequency band, and this achieves fast response in the driver 2.

The withstand voltages of the differential amplifier 21 and the PMOSFET 23 are lower than the withstand voltage of the current amplifier 24. The gain of the differential amplifier 21 is lower than the gain of the current amplifier 24. This helps achieve size reduction in the differential amplifier 21 and the PMOSFET 23.

The current amplifier 24 performs power amplification on the current Ia output from the drain of the PMOSFET 23. The supply voltage for the current amplifier 24 is a constant voltage VREG. That is, the current amplifier 24 operates from the voltage between the constant voltage VREG and the ground potential.

The PMOSFET 25 along with the first output transistor 1 constitutes a current mirror circuit. The PMOSFET 25 converts the current Ib output from the current amplifier 24 into a voltage and feeds this voltage to the gate of the first output transistor 1.

The reference voltage generator 3 generates the reference voltage VREF. The resistors 4 and 5 generate the feedback voltage VFB, which is a division voltage of the output voltage VOUT.

The output capacitor 6 and the load 7 are fed with the output voltage VOUT supplied from the output terminal T2.

The phase compensation circuit 8 includes a second output transistor 81, a resistor 82, a capacitor 83, and an operational amplifier 84. So long as a delay can be produced between the gate potentials of the first and second output transistors 1 and 81, any configuration can be employed such as one that, unlike the configuration of this embodiment, lacks the resistor 82 and the capacitor 83.

The second output transistor 81 is connected in parallel with the first output transistor 1. That is, the source of the second output transistor 81 is connected to the source of the first output transistor 1, and the drain of the second output transistor 81 is connected to the drain of the first output transistor 1. In this embodiment, so that the current that passes through the second output transistor 81 is higher than the current that passes through the first output transistor 1, the second output transistor 81 is given a larger size than the first output transistor 1. Here, "size" means "area".

One terminal of the resistor 82 is connected to the gates of the first output transistor 1 and the PMOSFET 25, and the other terminal of the resistor 82 is connected to the gate of the second output transistor 81.

The capacitor 83 is provided between the gate and the source of the second output transistor 81. In this embodiment, the parasitic capacitor of the second output transistor 81 is used as the capacitor 83. Instead, a capacitor other than the parasitic capacitor of the second output transistor 81 can be used as the capacitor 83, or the parasitic capacitor of the second output transistor 81 and a capacitor other than the parasitic capacitor of the second output transistor 81 can be used together as the capacitor 83. Including a capacitor other than the parasitic capacitor of the second output transistor 81 in the capacitor 83 makes it easy to adjust the capacitance value of the capacitor 83. It is preferable that the capacitance value of the capacitor 83 be higher than the capacitance value of the parasitic capacitance CPD. The phase compensation circuit 8 can further include a capacitance provided between the gate and the drain of the second output transistor 81.

The operational amplifier 84 is one example of a potential difference suppressor that suppresses a potential difference between the gates of the first and second output transistors 1 and 81. For example, the potential difference suppressor can be configured to monitor the voltage difference between the voltages at the gates of the first and second output transistors 1 and 81 and, if the voltage difference is equal to or larger than a predetermined value, to output a control signal with which at least one of the voltages at the gates of the first and second output transistors 1 and 81 is controlled so as to reduce the potential difference between the gates of the first and second output transistors 1 and 81. In this embodiment, the operational amplifier 84 outputs the control signal.

The operational amplifier 84 has an input offset voltage 84A. The non-inverting input terminal of the operational amplifier 84 is connected to the gate of the first output transistor 1. The inverting input terminal and the output terminal of the operational amplifier 84 are connected to the gate of the first output transistor 1. With this configuration, if the potential difference between the gates of the first and second output transistors 1 and 81 exceeds the input offset voltage 84A, the operational amplifier 84 operates so as to keep the potential difference between the gates of the first and second output transistors 1 and 81 equal to the input offset voltage 84A.

Figure 2:
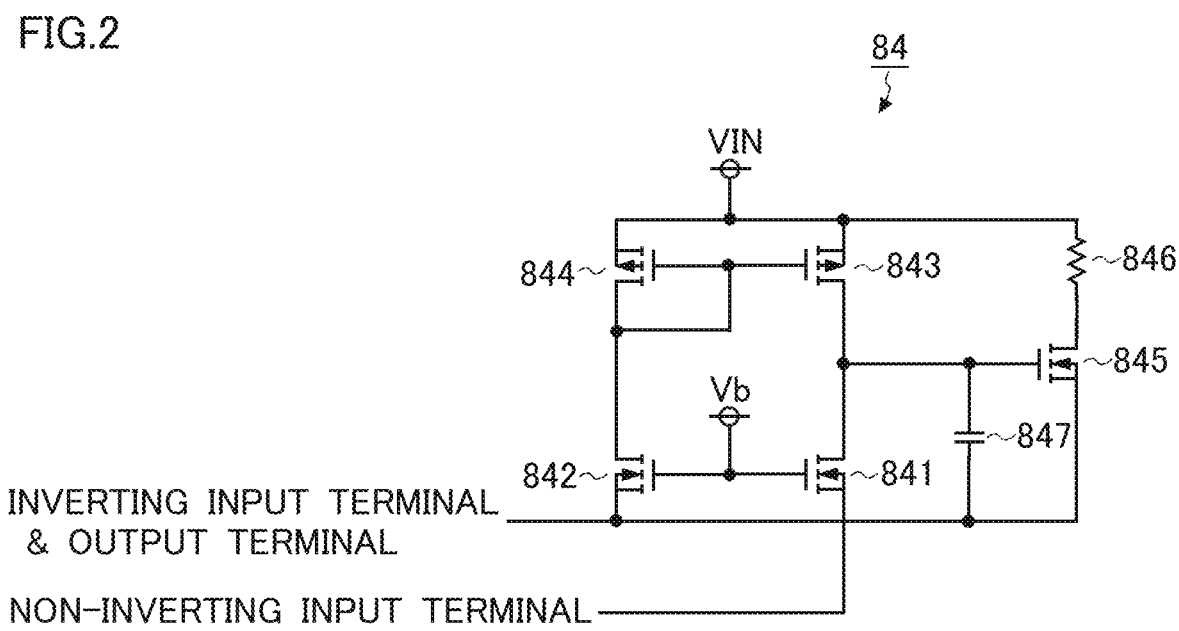
FIG. 2 is a diagram showing one configuration example of an operational amplifier.

FIG. 2 is a diagram showing one configuration example of the operational amplifier 84. The operational amplifier 84 of the configuration example shown in FIG. 2 includes an NMOSFET 841 as a first input differential pair transistor, an NMOSFET 842 as a second input differential pair transistor, PMOSFETs 843 and 844 constituting a current mirror circuit, an NMOSFET 845 as a source-follower output stage, and a resistor 846 and a capacitor 847 as a phase compensation element.

The current mirror circuit mentioned above supplies the NMOSFET 841 with a first current, and supplies the NMOSFET 842 with a second current, which is a mirror current of the first current mentioned above.

The source of the NMOSFET 841 serves as the non-inverting input terminal of the operational amplifier 84, the source of the NMOSFET 842 serves as the inverting input terminal of the operational amplifier 84, and the source of the NMOSFET 845 serves as the output terminal of the operational amplifier 84. A bias voltage Vb is fed to the gates of the NMOSFETs 841 and 842. The drain of the NMOSFET 842 is connected to the drain of the PMOSFET 843 and to the gate of the NMOSFET 845. The drain of the NMOSFET 842 is connected to the drain and the gate of the PMOSFET 844 and to the gate of the PMOSFET 843. The input voltage VIN is fed to the source of the PMOSFET 843, to the source of the PMOSFET 844, and to the drain of the NMOSFET 845. The source of the NMOSFET 845 is connected to the source of the NMOSFET 842.

In the operational amplifier 84 of the configuration example shown in FIG. 2, the input offset voltage 84A is produced as a result of either the NMOSFETs 841 and 842 being given different channel width-to-channel length ratios or the first and second currents mentioned above being given different values (the current mirror circuit mentioned above being given a mirror ratio other than one). With this condition, it is easy to obtain an input offset voltage 84A as designed.

Moreover, owing to the operational amplifier 84 of the configuration example shown in FIG. 2 including a phase compensation element, the operational amplifier 84 accomplishes notable potential difference suppression, and this makes it possible to suppress an overshoot in the output voltage VOUT more effectively than if the operational amplifier 84 includes no phase compensation element.

One terminal of the resistor 846 as a phase compensation element is connected to the drain of the NMOSFET 845, and the capacitor 847 as a phase compensation element is provided between the gate and the source of the NMOSFET 845. The other terminal of the resistor 846 as a phase compensation element is fed with the input voltage VIN. Disposing phase compensation elements at appropriate places in the operational amplifier 84 in this way permits the operational amplifier 84 to accomplish more notable potential difference suppression.

Figure 3:
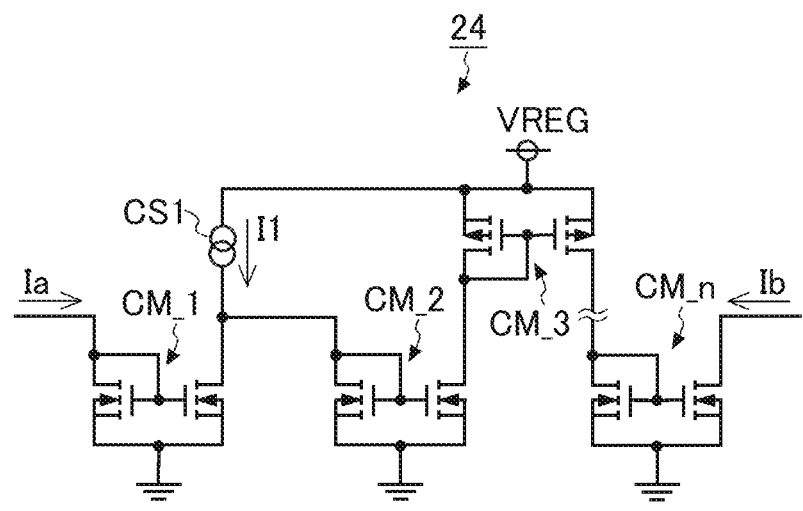
FIG. 3 is a diagram showing one configuration example of a current amplifier.

FIG. 3 is a diagram showing one configuration example of the current amplifier 24 in the linear power supply circuit shown in FIG. 1. The current amplifier 24 includes current-sink current mirror circuits CM_1, CM_2, . . . and CM_n and current-source current mirror circuits CM_3, . . . and CM_n−1 (though CM_n−1 is not shown in FIG. 2B). Between, at one end, the current-sink current mirror circuit CM_1 and a constant current source CS1 that produces a constant current I1 and, at the other end, the current-sink current mirror circuit CM_n, from the input to the output of the current amplifier 24, current-sink current mirror circuits and current-source current mirror circuits are disposed alternately so as to amplify a current. The amplified current becomes, in the final stage, a current Ib, which will be converted into the voltage of the gate signal G1.

Figure 4:
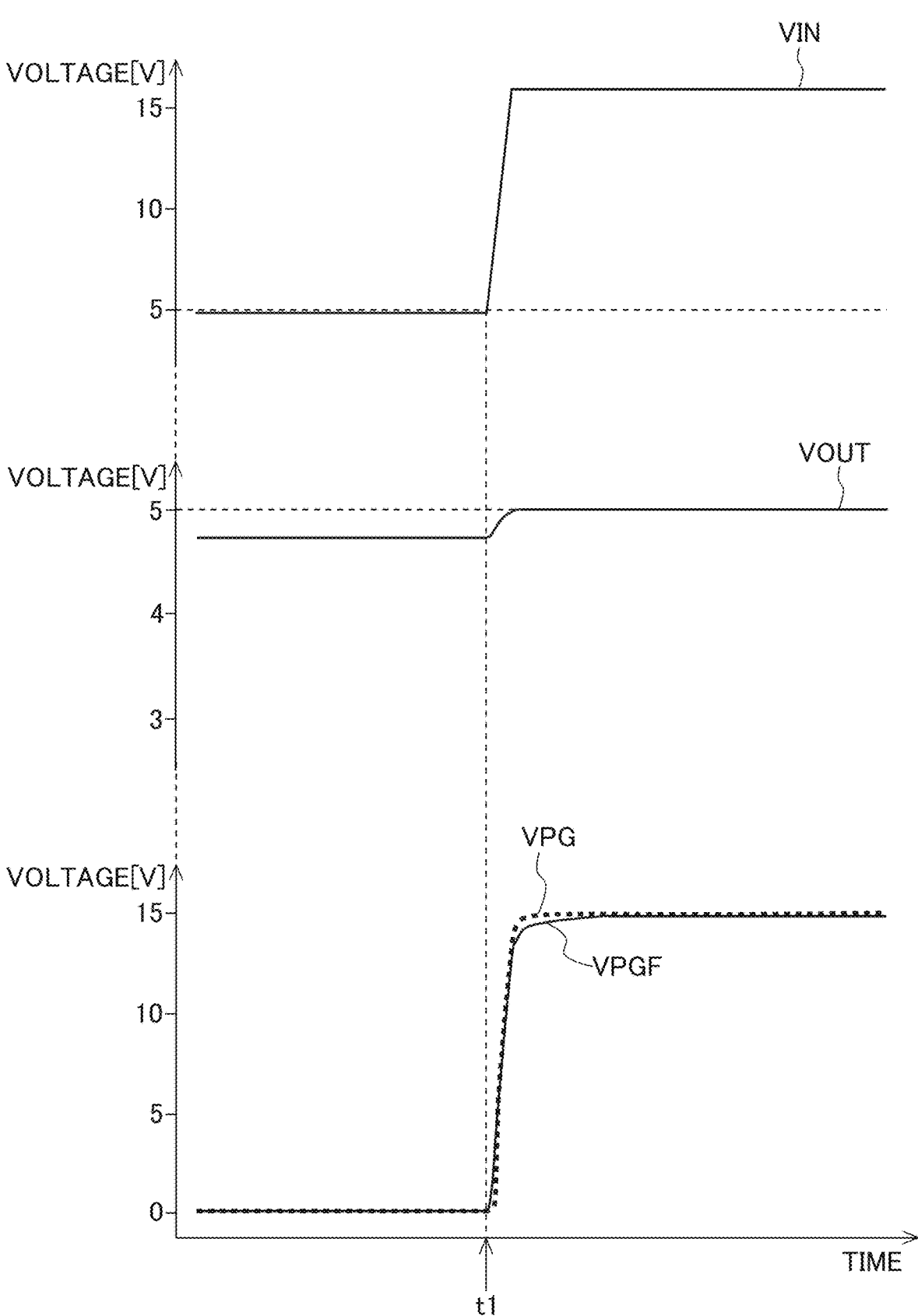
FIG. 4 is a diagram showing the relationship among the gate voltages of a first and a second output transistor and the output voltage in the linear power supply circuit shown in FIG. 1.

FIG. 4 is a diagram showing the relationship among the input voltage VIN, the gate voltages of the first and second output transistors 1 and 81, and the output voltage VOUT in the linear power supply circuit shown in FIG. 1. In FIG. 4, the vertical axis represents voltage and the horizontal axis represents time. That is, FIG. 4 shows show each of the input voltage VIN, the output voltage VOUT, the gate voltage (gate signal G1) VPG that drives the first output transistor 1, and the gate voltage VPGF that drives the second output transistor 81 varies as time passes.

FIG. 4 reveals the following. At time point t1, at which the input voltage VIN starts to rises from 4.75 V to 16 V, also the gate voltages VPG and VPGF start to rise. Here, with no delay from the rise of the gate voltage VPG, the gate voltage VPGF rises. That is, the gate voltage gate voltages VPG and VPGF rise together. This results from the operational amplifier 84 suppressing the voltage difference between the gate voltages VPG and VPGF.

If attention is paid to the conductances of the first and second output transistors 1 and 81, owing to the voltage difference between the gate voltages VPG and VPGF being suppressed, also the difference between their conductances is suppressed. Thus an overshoot in the output voltage VOUT is suppressed so that it will not greatly exceed the target output voltage of 5 V. If, as described above, the input voltage VIN rises from a state where the input voltage VIN and the output voltage VOUT have nearly equal values, the output voltage VOUT exhibits the largest overshoot. With the linear power supply circuit shown in FIG. 1, however, it is possible to keep the maximum value of the output voltage VOUT on occurrence of an overshoot in it as low as about 1.1 times the target value of the output voltage VOUT.

Second Embodiment

Figure 5:
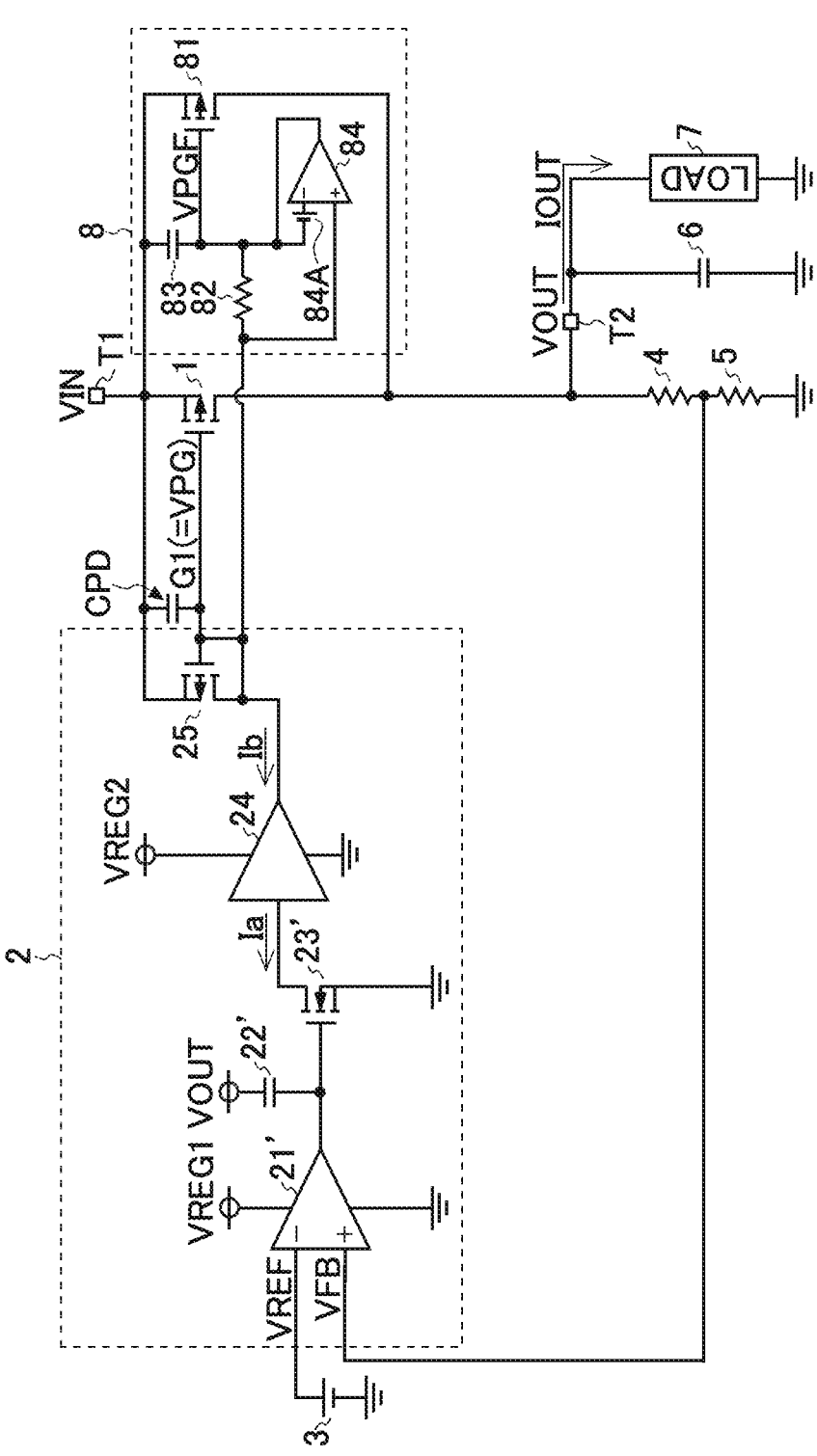
FIG. 5 is a diagram showing a configuration example of a linear power supply circuit according to a second embodiment.

FIG. 5 is a diagram showing the configuration of a linear power supply circuit according to a second embodiment. In FIG. 5, such parts as are found also in FIG. 1 are identified by the same reference signs, and no detailed description of them will be repeated.

In this embodiment, the driver 2 includes a differential amplifier 21', a capacitance 22', an NMOSFET 23', a current amplifier 24, and a PMOSFET 25.

The differential amplifier 21' outputs a voltage corresponding to the difference between the feedback voltage VFB and the reference voltage VREF. The supply voltage for the differential amplifier 21' is a first constant voltage VREG1. That is, the differential amplifier 21' operates from the voltage between the first constant voltage VREG1 and the ground potential.

The withstand voltages of the differential amplifier 21' and the NMOSFET 23' are lower than the withstand voltage of the current amplifier 24. The gain of the differential amplifier 21' is lower than the gate of the current amplifier 24. This helps achieve size reduction in the differential amplifier 21' and the NMOSFET 23'.

One terminal of the capacitance 22' is fed with the output of the differential amplifier 21', and the other terminal of the capacitance 22' is fed with the output voltage VOUT. Instead of the output voltage VOUT, a voltage that depends on the output voltage VOUT can be fed to the other terminal of the capacitance 22.

The source of the NMOSFET 23' is fed with the ground potential, and the gate of the NMOSFET 23' is fed with a voltage (the voltage at the connection node between the differential amplifier 21' and the capacitance 22') based on the output of the differential amplifier 21'. The NMOSFET 23' converts the voltage based on the output of the differential amplifier 21' into a current and outputs this current from its drain. The connection node between the differential amplifier 21' and the capacitance 22' is grounded to the output voltage VOUT in a high-frequency band, and this achieves fast response in the driver 2.

Figure 6:
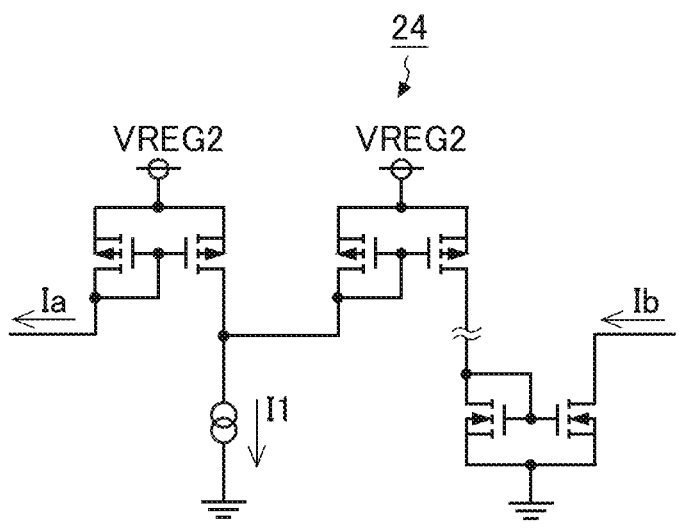
FIG. 6 is a diagram showing another configuration example of a current amplifier.

The current amplifier 24 performs current amplification on the current Ia output from the drain of the NMOSFET 23'. The supply voltage for the current amplifier 24 is a second constant voltage VREG2. That is, the current amplifier 24 operates from the voltage between the second constant voltage VREG2 and the ground potential. The first and second constant voltages VERG1 and VREG2 can have equal values, or can have different values. In this configuration example, considering that the current Ia passes from the current amplifier 24 to the NMOSFET 23', the current amplifier 24 can be given, for example, a circuit configuration as shown in FIG. 6.

The phase compensation circuit in the linear power supply circuit according to this embodiment shown in FIG. 5 is similar to that in the linear power supply circuit according to the first embodiment shown in FIG. 1. Thus, a similar effect acts to suppress an overshoot in the output voltage VOUT. Moreover, in the linear power supply circuit according to this embodiment shown in FIG. 5, even if the output voltage VOUT has a low set value, the differential amplifier 21' can operate without fail. In a case where a low voltage is used as the input voltage VIN, instead of the first constant voltage VREG1, the input voltage VIN can be used as the supply voltage for the differential amplifier 21', and instead of the second constant voltage VREG2, the input voltage VIN can be used as the supply voltage for the current amplifier 24.

Third Embodiment

Figure 7:
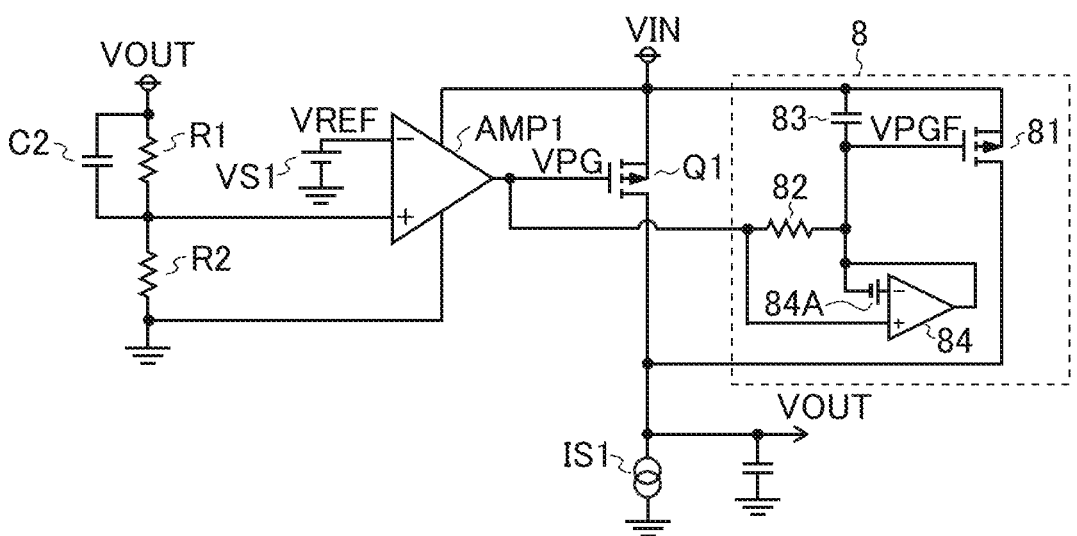
FIG. 7 is a diagram showing a configuration example of a linear power supply circuit according to a third embodiment.

FIG. 7 is a diagram showing the configuration of a linear power supply circuit according to a third embodiment. In the linear power supply circuit shown in FIG. 7, the phase compensation circuit 8 is applied to a linear power supply circuit that has a generally well-known PMOS source-grounded output stage.

Since the linear power supply circuit with a PMOS source-grounded output stage shown in FIG. 7 is well known as a conventional technology, no detailed description will be given. Also with the linear power supply circuit shown in FIG. 7, suppressing a difference between the conductances of the output transistor Q1 and the second output transistor 81 helps suppress an overshoot in the output voltage.

As described above, a phase compensation circuit according to the invention disclosed herein can be applied not only to the linear power supply circuits according to the first and second embodiments but also to a configuration that includes a plurality of output transistors.

Fourth Embodiment

Figure 8:
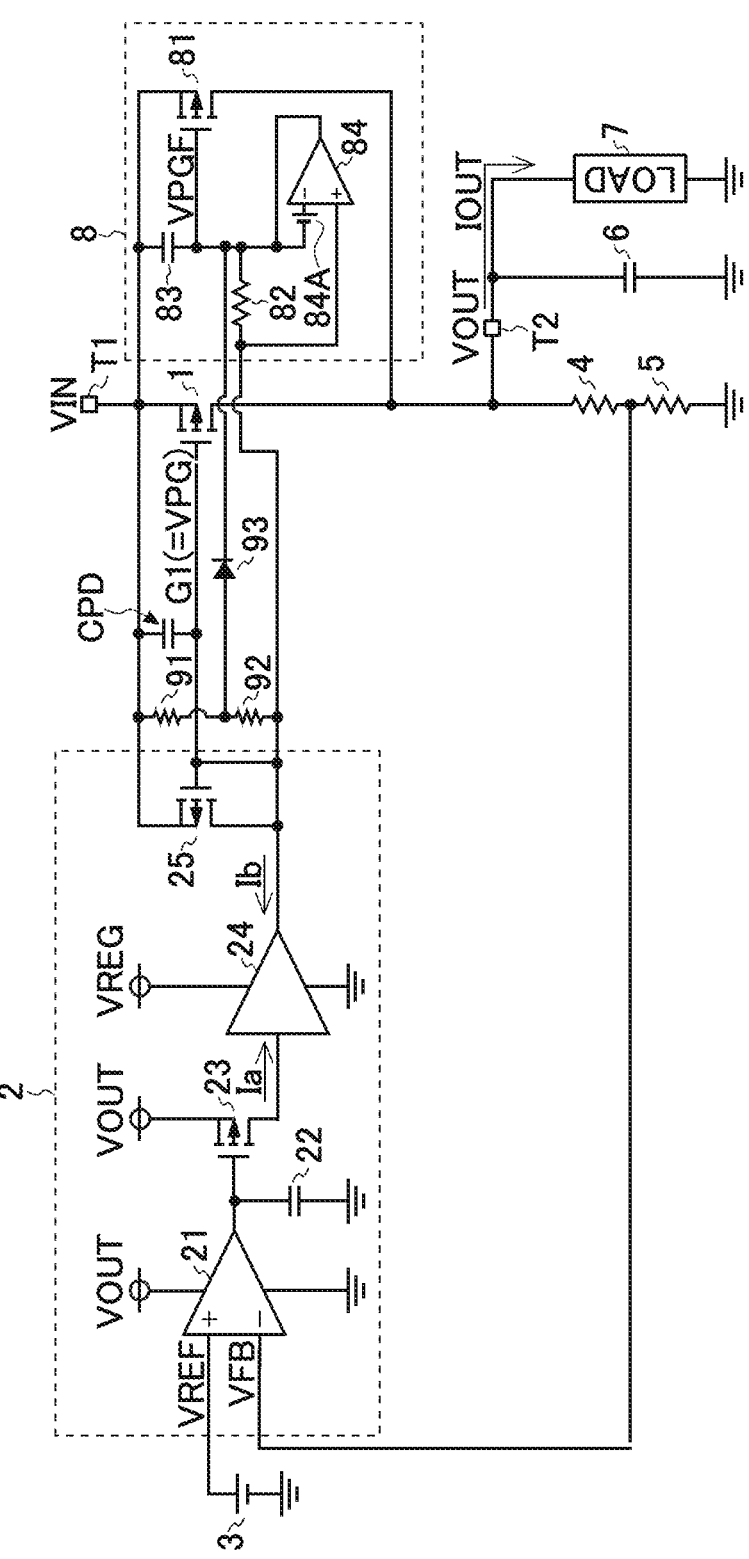
FIG. 8 is a diagram showing a configuration example of a linear power supply circuit according to a fourth embodiment.

FIG. 8 is a diagram showing the configuration of a linear power supply circuit according to a fourth embodiment. The linear power supply circuit shown in FIG. 8 has a configuration resulting from adding a clamper circuit to the linear power supply circuit according to the first embodiment shown in FIG. 1.

The clamper circuit is configured to clamp the voltage applied to the gate of the second output transistor 81. Owing to the provision of the clamper circuit, even if the operational amplifier 84 has a fault, the voltage applied to the gate of the second output transistor 81 is prevented from becoming excessively high.

In this embodiment, the clamper circuit includes resistors 91 and 92 and a diode 93. The resistors 91 and 92 constitute a voltage division circuit configured to produce a division voltage of the difference between the input voltage VIN and the voltage applied to the gate of the first output transistor 1. The anode of the diode 93 is fed with the division voltage output from the voltage division circuit (i.e., the voltage appearing at the connection node between the resistors 91 and 92). The cathode of the diode 93 is connected to the gate of the second output transistor 81.

In this embodiment, the clamper circuit is implemented with a simple circuit configuration. This helps suppress an increase in cost and in implementation area resulting from the addition of the clamper circuit.

While in this embodiment the clamper circuit is added to the linear power supply circuit according to the first embodiment, the clamper circuit can be added not only to the linear power supply circuit according to the first embodiment but also to the linear power supply circuit according to the second embodiment or to the linear power supply circuit according to the third embodiment.

Application Example 1

Figure 9A:
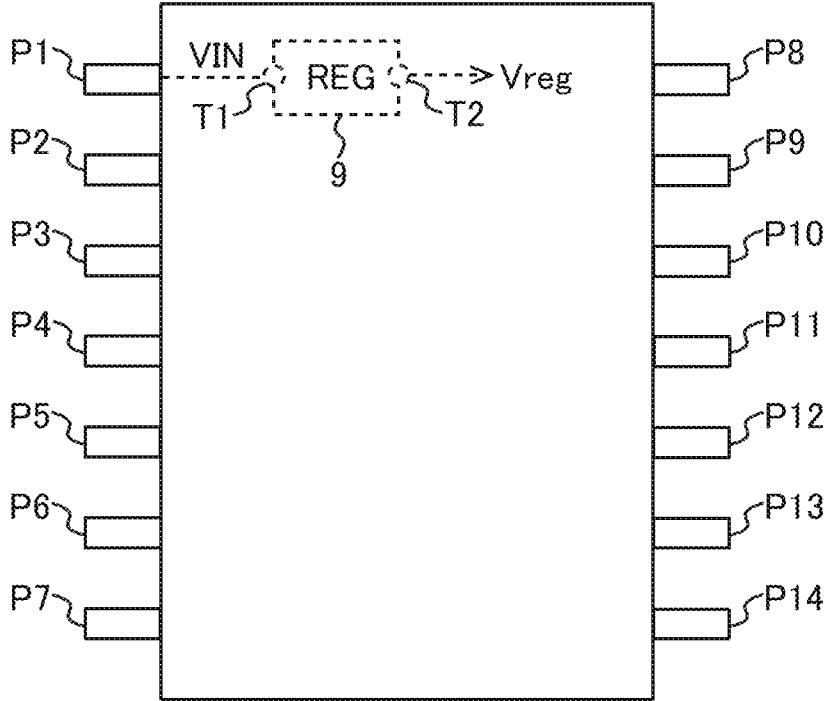
FIG. 9A is an exterior view of a semiconductor integrated circuit device.

FIG. 9A is an exterior view of a semiconductor integrated circuit device. The semiconductor integrated circuit device shown in FIG. 9A has external pins P to P14 and incorporates an internal power supply 9. The internal power supply 9 is the linear power supply circuit according to any of the first to fourth embodiments described previously. Incorporation is possible either with or without an output capacitor. The internal power supply 9 supplies at least any of the circuits in the semiconductor integrated circuit device shown in FIG. 9A with an internal supply voltage Vreg (i.e., the output voltage VOUT of the linear power supply circuit).

Application Example 2

Figure 9B:
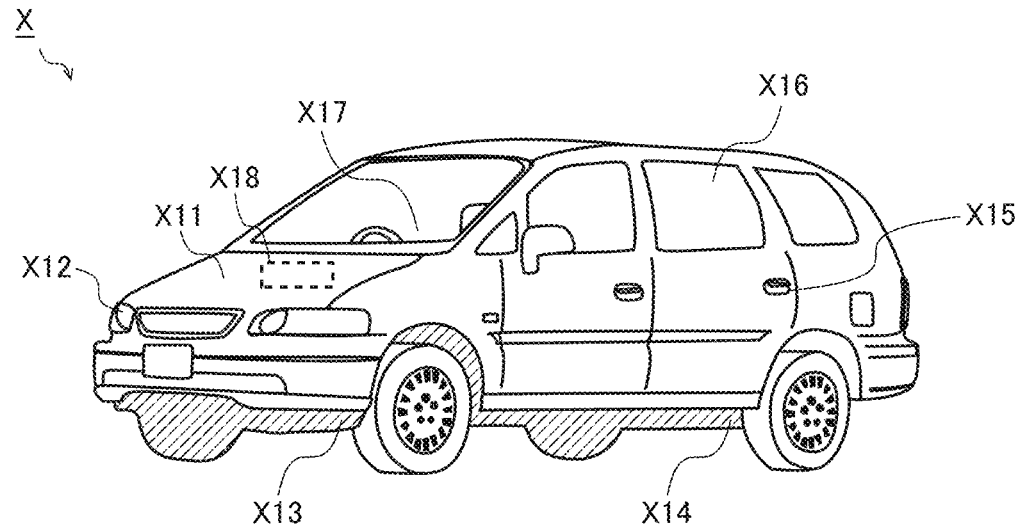
FIG. 9B is an exterior view of a vehicle.
Figure 10:
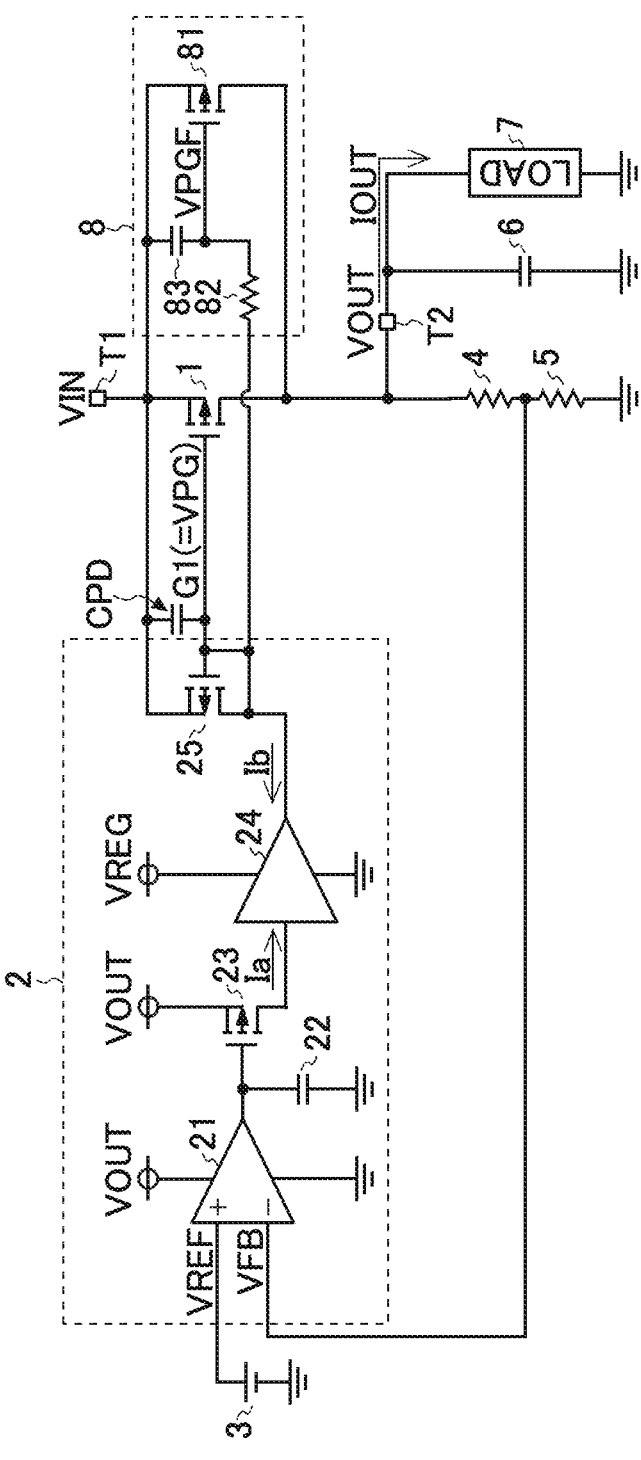
FIG. 10 is a diagram showing one configuration example of a linear power supply circuit according to JP-A-2020-71681.
Figure 11:
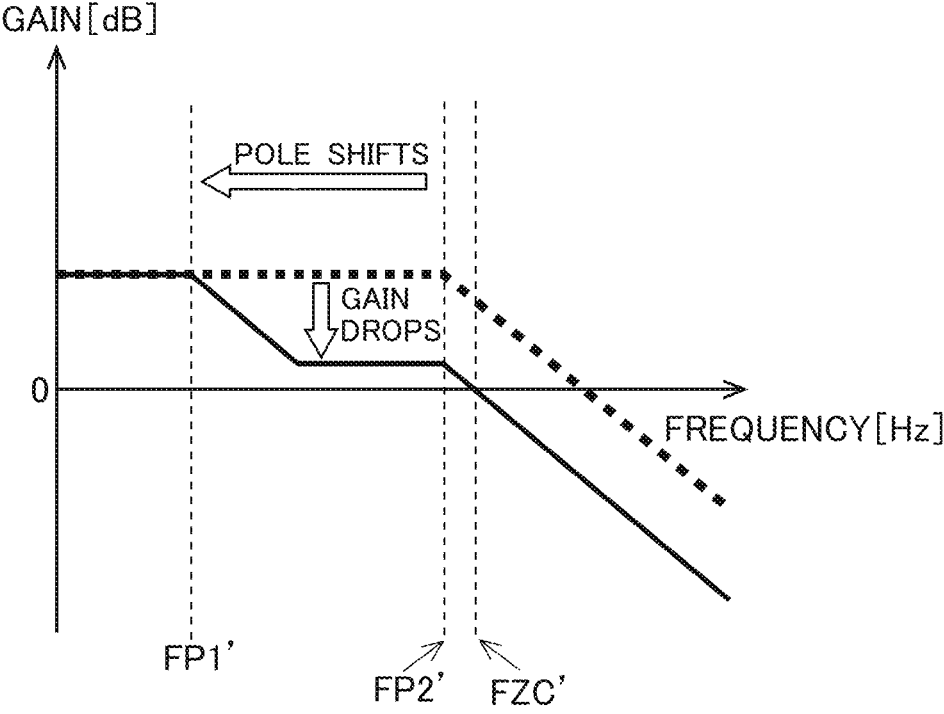
FIG. 11 is a diagram showing the gain characteristics of the transfer function of the linear power supply circuit and an output capacitor shown in FIG. 10.

FIG. 9B is an exterior view of a vehicle X. The vehicle X of this configuration example incorporates various electronic devices X11 to X18 that operate by being supplied with a voltage output from an unillustrated battery. For the sake of convenience, in the diagram, the electronic devices X11 to X18 may be shown at places different from where they are actually arranged.

The electronic device X11 is an engine control unit that performs control with respect to an engine (injection control, electronic throttle control, idling control, oxygen sensor heater control, automatic cruise control, etc.).

The electronic device X12 is a lamp control unit that controls the lighting and extinguishing of HIDs (high-intensity discharged lamps), DRLs (daytime running lamps), or the like.

The electronic device X13 is a transmission control unit that performs control with respect to a transmission.

The electronic device X14 is a movement control unit that performs control with respect to the movement of the vehicle X (ABS [anti-lock brake system] control, EPS [electric power steering] control, electronic suspension control, and the like).

The electronic device X15 is a security control unit that drives and controls door locks, burglar alarms, and the like.

The electronic device X16 comprises electronic devices incorporated in the vehicle X as standard or manufacturer-fitted equipment at the stage of factory shipment, such as wipers, power side mirrors, power windows, dampers (shock absorbers), a power sun roof, and power seats.

The electronic device X17 comprises electronic devices fitted to the vehicle X optionally as user-fitted equipment, such as A/V (audio/visual) equipment, a car navigation system, and an ETC (electronic toll control system).

The electronic device X18 comprises electronic devices provided with high-withstand-voltage motors, such as a vehicle-mounted blower, an oil pump, a water pump, and a battery cooling fan.

Any of the linear power supply circuits described previously can be incorporated in any of the electronic devices X11 to X18.

Notes

The embodiments described above should be considered to be in every aspect illustrative and not restrictive, and the technical scope of the invention disclosed herein should be understood to be defined not by the description of the embodiments given above but by the appended claims and encompass any modifications within a scope and sense equivalent to those claims.

The phase compensation circuit can be any circuit that can suppress a delay between the driving signals for transistors that are connected in parallel, and its circuit configuration is not limited to that of the phase compensation circuit 8, which is merely one specific example.

Any of the MOSFETs used in the embodiments described above can be replaced with a bipolar transistor.

According to one aspect of what is disclosed herein, a linear power supply circuit includes: an output stage including a first output transistor (1, Q1) and a second output transistor (81) connected in parallel with each other between an input terminal configured to have an input voltage applied thereto and an output terminal configured to have an output voltage applied thereto; a driver (2, AMP1) configured to drive the first and second output transistors according to the difference between a voltage based on the output voltage and a reference voltage; and a potential difference suppressor (84) configured to suppress the potential difference between the control terminal of the first output transistor and the control terminal of the second output transistor. The potential difference suppressor includes an operational amplifier. The non-inverting input terminal of the operational amplifier is connected to the control terminal of the first output transistor, and the inverting input terminal and the output terminal of the operational amplifier are connected to the control terminal of the second output transistor. The operational amplifier includes a phase compensation element (836, 847). (A first configuration.)

In the linear power supply circuit of the first configuration described above, the potential difference between the control terminals of the first and second output transistors is suppressed, and this helps suppress an overshoot in the output voltage. Moreover, owing to the operational amplifier including a phase compensation element, the potential difference suppressor accomplishes notable potential difference suppression, and this makes it possible to suppress an overshoot in the output voltage more effectively than if the operational amplifier includes no phase compensation element.

In the linear power supply circuit of the first configuration described above, the operational amplifier may include an output-stage transistor (845) constituting a source-follower output stage or an emitter-follower output stage. The phase compensation element may include a resistor (846) and a capacitor (847). If the output-stage transistor constitutes a source-follower output stage, the resistor may be connected to the drain of the output-stage transistor and the capacitor may be connected between the gate the a source of the output-stage transistor. If the output-stage transistor constitutes an emitter-follower output stage, the resistor may be connected to the collector of the output-stage transistor and the capacitor may be connected between the base and the emitter of the output-stage transistor. (A second configuration.)

In the linear power supply circuit of the second configuration described above, owing to the phase compensation element being disposed at an appropriate place in the operational amplifier, the potential difference suppressor accomplishes more notable potential difference suppression.

In the linear power supply circuit of the first or second configuration described above, the operational amplifier may have an input offset voltage. (A third configuration.)

In the linear power supply circuit of the third configuration described above, the operational amplifier operates so as to keep the potential difference between the control terminals of the first and second output transistors equal to the input offset voltage. It is thus easy to adjust to what extent to suppress the potential difference.

In the linear power supply circuit of the third configuration described above, the operational amplifier may include: a first input differential pair transistor (841) connected to the control terminal of the first output transistor; a second input differential pair transistor (842) connected to the control terminal of the second output transistor; and a current mirror circuit (843, 844) configured to supply the first input differential pair transistor with a first current and to supply the second input differential pair transistor with a second current, which is a mirror current of the first current. The input offset voltage may be produced as a result of either the first and second input differential pair transistors both being MOS transistors and being given different channel width-to-channel length ratios or the first and second currents being given different values. (A fourth configuration.)

With the linear power supply circuit of the fourth configuration described above, it is easy to obtain an input offset voltage as designed.

The linear power supply circuit of any of the first to fourth configurations described above may further comprise: a clamper circuit (91, 92, 93) configured to clamp the voltage applied to the control terminal of the second output transistor. (A fifth configuration.)

With the linear power supply circuit of the fifth configuration described above, even if the potential difference suppressor has a fault, the voltage applied to the control terminal of the second output transistor can be prevented from becoming excessively high.

In the linear power supply circuit of the fifth configuration described above, the clamper circuit may include: a voltage division circuit (91, 92) configured to produce a division voltage of the difference between the input voltage and the voltage applied to the control terminal of the first output transistor; and a diode (93) configured to have applied to its anode the division voltage output from the voltage division circuit and to have its cathode connected to the control terminal of the second output transistor. (A sixth configuration.)

In the linear power supply circuit of the sixth configuration described above, the clamper circuit is implemented with a simple circuit configuration. This helps suppress an increase in cost and in implementation area resulting from the addition of the clamper circuit.

According to another aspect of what is disclosed herein, a vehicle includes the linear power supply circuit of any of the first to six configurations described above. (A seventh configuration.)

With the vehicle of the seventh configuration described above, it is possible to suppress an overshoot in the output voltage of the linear power supply circuit.

What is claimed is:

1. A linear power supply circuit comprising:
an output stage including a first output transistor and a second output transistor connected in parallel with each other between an input terminal configured to have an input voltage applied thereto and an output terminal configured to have an output voltage applied thereto;
a driver configured to drive the first and second output transistors according to a difference between a voltage based on the output voltage and a reference voltage; and
a potential difference suppressor configured to suppress a potential difference between a control terminal of the first output transistor and a control terminal of the second output transistor,
wherein
the potential difference suppressor includes an operational amplifier,
a non-inverting input terminal of the operational amplifier is connected to the control terminal of the first output transistor,
an inverting input terminal and an output terminal of the operational amplifier are connected to the control terminal of the second output transistor, and
the operational amplifier includes a phase compensation element.

2. The linear power supply circuit according to claim 1, wherein
the operational amplifier includes an output-stage transistor constituting a source-follower output stage or an emitter-follower output stage,
the phase compensation element includes a resistor and a capacitor,
if the output-stage transistor constitutes a source-follower output stage, the resistor is connected to a drain of the output-stage transistor and the capacitor is connected between a gate and a source of the output-stage transistor, and
if the output-stage transistor constitutes an emitter-follower output stage, the resistor is connected to a collector of the output-stage transistor and the capacitor is connected between a base and an emitter of the output-stage transistor.

3. The linear power supply circuit according to claim 1, wherein
the operational amplifier has an input offset voltage.

4. The linear power supply circuit according to claim 3, wherein
the operational amplifier includes:
a first input differential pair transistor connected to the control terminal of the first output transistor;
a second input differential pair transistor connected to the control terminal of the second output transistor; and
a current mirror circuit configured to supply the first input differential pair transistor with a first current and to supply the second input differential pair transistor with a second current, which is a mirror current of the first current, and
the input offset voltage is produced as a result of either the first and second input differential pair transistors both being MOS transistors and being given different channel width-to-channel length ratios or the first and second currents being given different values.

5. The linear power supply circuit according to claim 1, further comprising:

a clamper circuit configured to clamp a voltage applied to the control terminal of the second output transistor.

6. The linear power supply circuit according to claim 5, wherein the clamper circuit includes:

a voltage division circuit configured to produce a division voltage of a difference between the input voltage and a voltage applied to the control terminal of the first output transistor; and a diode configured to have applied to an anode thereof the division voltage output from the voltage division circuit, the diode having a cathode thereof connected to the control terminal of the second output transistor.

7. A vehicle comprising the linear power supply circuit according to claim 1.

8. A vehicle comprising the linear power supply circuit according to claim 2.

9. A vehicle comprising the linear power supply circuit according to claim 3.

10. A vehicle comprising the linear power supply circuit according to claim 4.

11. A vehicle comprising the linear power supply circuit according to claim 5.

12. A vehicle comprising the linear power supply circuit according to claim 6.

\* \* \* \* \*

14